US012627778B2

(12) United States Patent
Van Wiemeersch et al.

(10) Patent No.: US 12,627,778 B2
(45) Date of Patent: May 12, 2026

(54) REDUCED INCIDENTAL PROJECTION OF IN-DASH PROJECTOR

(71) Applicant: Ford Global Technologies, LLC, Dearborn, MI (US)

(72) Inventors: John Robert Van Wiemeersch, Novi, MI (US); Ryan Joseph Gorski, Grosse Pointe Farms, MI (US); Brendan Francis Diamond, Grosse Pointe, MI (US); Haibo Zhao, Northville, MI (US); Janice Lisa Tardiff, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 525 days.

(21) Appl. No.: 18/184,904

(22) Filed: Mar. 16, 2023

(65) Prior Publication Data

US 2024/0314276 A1     Sep. 19, 2024

(51) Int. Cl.
*H04N 9/31* (2006.01)
*B60K 35/231* (2024.01)
*G02B 27/01* (2006.01)

(52) U.S. Cl.
CPC ......... *H04N 9/3179* (2013.01); *B60K 35/231* (2024.01); *G02B 27/0103* (2013.01); *B60K 2360/29* (2024.01); *G02B 2027/0118* (2013.01)

(58) Field of Classification Search
None
See application file for complete search history.

(56) References Cited

U.S. PATENT DOCUMENTS

| | | | |
|---|---|---|---|
| 5,053,755 A | 10/1991 | Smith et al. | |
| 5,214,413 A | 5/1993 | Okabayashi et al. | |
| 5,281,985 A | 1/1994 | Chan | |
| 8,317,329 B2 | 11/2012 | Seder et al. | |
| 2010/0253492 A1 | 10/2010 | Seder et al. | |
| 2016/0316184 A1 | 10/2016 | Kim et al. | |
| 2017/0085941 A1 | 3/2017 | Gupta et al. | |
| 2017/0195647 A1 | 7/2017 | Honkanen et al. | |
| 2019/0056587 A1* | 2/2019 | Zhang .................... | B60K 35/10 |
| 2019/0101865 A1 | 4/2019 | Popkova et al. | |

(Continued)

FOREIGN PATENT DOCUMENTS

| | | |
|---|---|---|
| DE | 102018213449 A1 | 2/2020 |
| JP | 2005077716 A | 3/2005 |

(Continued)

OTHER PUBLICATIONS

Non-Final Office Action for U.S. Appl. No. 18/184,879, filed Mar. 16, 2023, as issued by the USPTO Aug. 15, 2024.

(Continued)

*Primary Examiner* — Bao-Luan Q Le
*Assistant Examiner* — Danell L Owens
(74) *Attorney, Agent, or Firm* — Frank Lollo; Brooks Kushman P.C.

(57) ABSTRACT

A vehicle-integrated projector projects an image onto a window of a vehicle including a layer of holographic film. Upon detecting a sensed condition indicative of a possible projection of the image onto a surface beyond the window, projection of the image is adjusted to diminish a visibility of the projection of the image beyond the window independent of headlight actuation.

20 Claims, 7 Drawing Sheets

(56)                    References Cited

U.S. PATENT DOCUMENTS

| | | |
|---|---|---|
| 2019/0317325 A1 | 10/2019 | Malinovskaya et al. |
| 2020/0184841 A1 | 6/2020 | Wickman et al. |
| 2020/0353817 A1 | 11/2020 | Nakada et al. |
| 2021/0371325 A1 | 12/2021 | Black et al. |
| 2022/0283458 A1 | 9/2022 | Richards |

FOREIGN PATENT DOCUMENTS

| | | | | |
|---|---|---|---|---|
| KR | 20160149112 A | 12/2016 | | |
| KR | 20180113132 A | 10/2018 | | |
| WO | WO-2016018320 A1 * | 2/2016 | ............. | G08G 1/167 |
| WO | WO-2020090187 A1 * | 5/2020 | ........... | B60K 35/235 |
| WO | 2021021583 A1 | 2/2021 | | |

OTHER PUBLICATIONS

An, Z., et al., "Design and Performance of an Off-axis Free-form Mirror for a Rear Mounted Augmented-reality Head-up Display System," IEEE Photonics Journal, vol. 13, Issue: 1, Feb. 2021, 17 pages.

Muruganandam, R., "Heads Up Display," SAE International, Aug. 2007, 7 pages.

Firth, M., "In-plane Holographic Transparent Windscreen Displays," Texas Instruments, Jan. 2021, 6 pages.

\* cited by examiner 156
158
158
192
152
158
158
154

122

202 — Start

204 — Project an image.

206 — Condition for projection beyond window sensed?     No

200

Yes

208 — Diminish a visibility of the projection of the image.

210 — End

REDUCED INCIDENTAL PROJECTION OF IN-DASH PROJECTOR

BACKGROUND

Vehicles may be equipped with heads-up displays (HUDs) providing a field of view limited to a first occupant having their eyes or eye disposed in an eye-box. The eye-box is a geometrically defined space inside the vehicle from which the first occupant may view the images projected by the HUD. Occupants other than the first occupant, seated in design intent positions within the vehicle, are not able to see the images projected by the HUD associated with the first occupant. Similarly, the other occupants may have their seating positions associated with a HUD that projects images such that the other occupants, but not the first occupant, can see when their eyes or eye are in the eye-box for the associated HUD.

DETAILED DESCRIPTION

Figure 1:
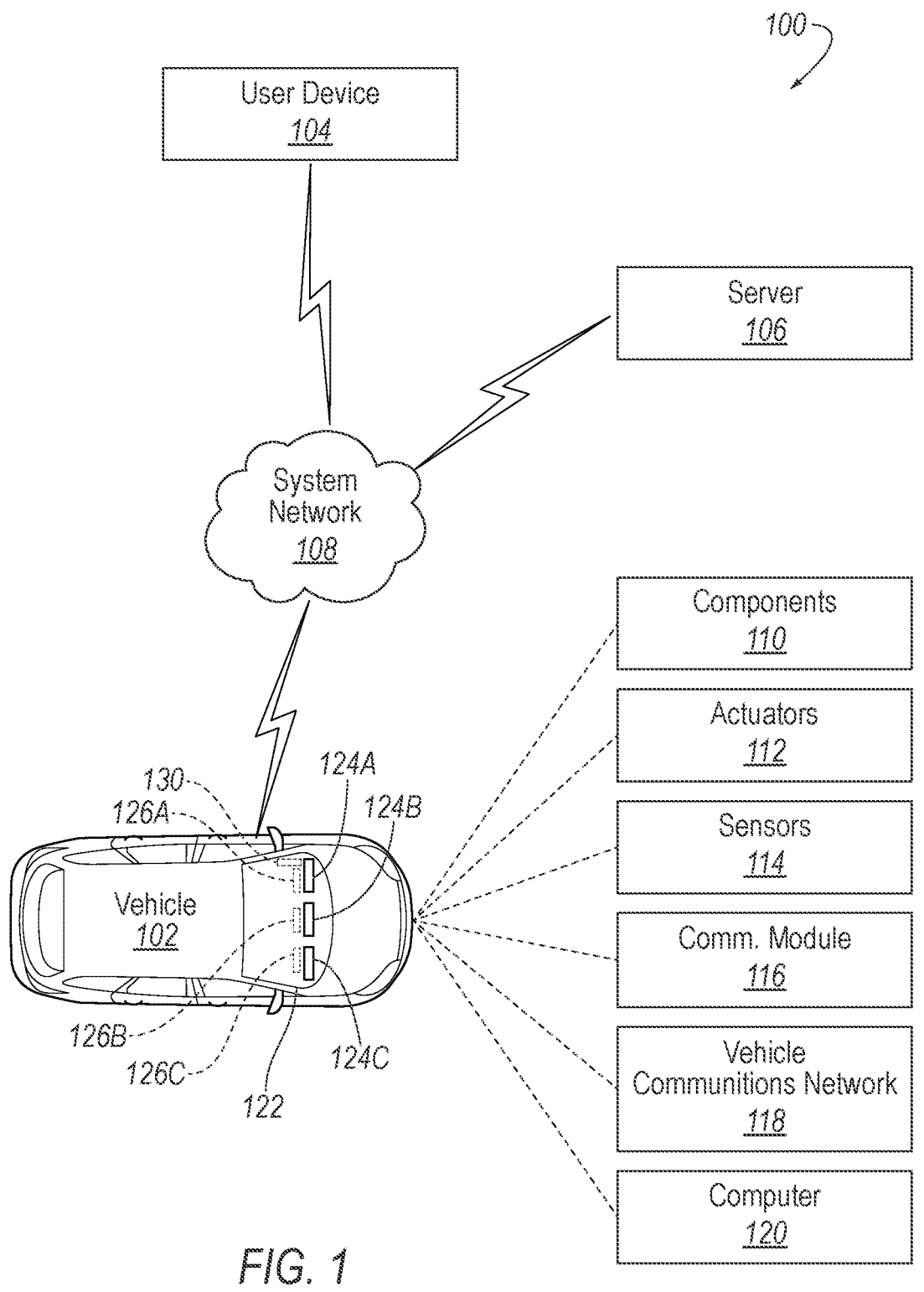
FIG. 1 is a block diagram illustrating an example image projection control system for a vehicle.

As described herein, a vehicle image projection control system may, upon detecting a condition indicative of a possible incidental projection of an image beyond a window of the vehicle, adjust the projection of the image to diminish a visibility of the incidental projection image beyond the window. Conditions indicative of such a possible incidental projection may include an ambient light level below a predetermined light level, and sensing a surface that may serve as a projection surface. Adjusting the projection of the incidental projection image may include dimming the image, blurring the image, and stopping projection of the image.

Advantageously, as described herein, a computing device comprises a processor and a memory. The memory of the vehicle image projection control system stores instructions executable by the processor such that the computer is programmed to execute such instructions. Such instructions may include the following. An image is projected from a vehicle-integrated projector for a heads-up display onto a window of a vehicle including a layer of holographic film, e.g., a layer of photopolymer film bearing one or more holographic optical elements. Upon detecting a sensed condition indicative of a possible projection of the image onto a surface beyond the window, projection of the image is adjusted to diminish a visibility of the projection of the image beyond the window independent of headlight actuation.

The computing device may be further programmed to consider additional factors prior to scheduling the sending of any message or messages to the user device as per the below clauses. To the extent that such features are not mutually exclusive, they may be combined with each other.

The diminishing of the visibility of the projection of the image beyond the window may be suppressed when potential viewers of the projection of the image beyond the window outside of the vehicle are not detected within a predetermined distance from the vehicle.

The condition indicative of the possible projection of the image onto the surface beyond the window may include a predetermined light level outside of the vehicle.

The condition indicative of the possible projection of the image onto the surface beyond the window may include a sensing of the surface in a path of the projection of the image from the vehicle.

The condition indicative of the possible projection of the image onto the surface beyond the window may include a sensing of a geographic location of the vehicle in a diminished light location.

Adjusting the image may include dimming the image.

Adjusting the image may include blurring a focus of the image beyond window, the blurring exceeding any inherent blurring.

Adjusting the image may include blurring being selectively applied to protected image content.

Adjusting the image may include stopping projection of the image from the projector.

Adjusting the image may include stopping projection of the image from the projector and wirelessly communicating the image to a user device of a passenger for viewing on the user device.

The window may include an electronically tintable layer disposed between the layer of holographic film and an exterior glass layer in at least a portion of the window that the projection of the image impinges on. Adjusting the image may include adjusting the tintable layer to a substantially opaque setting to substantially block the projection of the image beyond the tintable layer.

A method of restricting viewing of an image from a heads-up display ("HUD") projector projecting beyond a window is set forth below.

A method of restricting viewing of an image from a HUD projector projecting beyond a window includes a plurality of steps including the following. An image from a vehicle-integrated projector for a heads-up display is projected onto a window of a vehicle including a layer of holographic film. Upon detecting a sensed condition indicative of a possible projection of the image onto a surface beyond the window, projection of the image is adjusted to diminish a visibility of the projection of the image beyond the window independent of headlight actuation.

Additional steps that may be included are set forth below. Such additional steps may be combined with each other to the extent that they are not mutually exclusive.

The diminishing of the visibility of the projection of the image beyond the window may be suppressed when potential viewers of the projection of the image beyond the window outside of the vehicle are not detected within a predetermined distance from the vehicle.

The condition indicative of the possible projection of the image onto the surface beyond the window may include a predetermined light level outside of the vehicle.

The condition indicative of the possible projection of the image onto the surface beyond the window may include a sensing of the surface in a path of the projection of the image from the vehicle.

The condition indicative of the possible projection of the image onto the surface beyond the window may include a sensing of a geographic location of the vehicle in a diminished light location.

Adjusting the image may include dimming the image.

Adjusting the image may include blurring a focus of the image beyond window, the blurring exceeding any inherent blurring.

Adjusting the image may include blurring being selectively applied to protected image content.

Adjusting the image may include stopping projection of the image from the projector.

Adjusting the image may include stopping projection of the image from the projector and wirelessly communicating the image to a user device of a passenger for viewing on the user device.

The window may include an electronically tintable layer disposed between the layer of holographic film and an exterior glass layer in at least a portion of the window that the projection of the image impinges on. Adjusting the image may include adjusting the tintable layer to a substantially opaque setting to substantially block the projection of the image beyond the tintable layer.

With reference to FIGS. 1-10, a system for restricting viewing of an image from a HUD projector projecting beyond a window is set forth below is disclosed. While a windshield is the focus of the figures and the present description, the system and method described are suited for any vehicle window.

With particular reference to FIG. 1, an example vehicle image projection control system 100 can include the following example elements: a vehicle 102, a user device 104, a server 106, and a system network 108.

The vehicle 102 includes a plurality of vehicle components 110, a plurality of vehicle actuators 112, a plurality of vehicle sensors 114, a vehicle communication module 116, a vehicle communications network 118, and a vehicle computer 120.

In the context of the present disclosure, a vehicle component 110 is one or more hardware components adapted to perform a mechanical or electro-mechanical function or operation—such as moving the vehicle 102, slowing or stopping the vehicle 102, steering the vehicle 102, displaying information, etc. Non-limiting examples of components 110 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more restraint systems (e.g., airbags), a movable seat, a door lock component, headlights, dashboard instrumentation, an in-vehicle dashboard display screen, a window 122, an example window being a windshield 122, incorporating a holographic film layer having one or more holographic optical elements formed thereon to define one or more corresponding substantially transparent HUD screens 124A, 124B, 124C, digital light HUD projectors 126A, 126B, 126C, a virtual HUD projector 130, etc.

The vehicle actuators 112 are implemented via circuits, chips, or other electronic and or mechanical components that can actuate various vehicle subsystems in accordance with appropriate control signals as is known. The actuators 112 may be used to control the components 110, including brake components for braking, propulsion components for acceleration, steering components for steering of a vehicle 102, and door lock components for locking vehicle doors.

Vehicle sensors 114 may include a variety of devices such as are known to provide data to the vehicle computer 120. For example, the sensors 114 may include Light Detection And Ranging (LIDAR) sensors 114 that provide relative locations, sizes, and shapes of objects, including people, surrounding the vehicle 102. As another example, one or more radar sensors 114 may provide data to provide locations of the objects, second vehicles, etc., relative to the location of the vehicle 102. The sensors 114 may further alternatively or additionally, for example, include cameras 114, e.g., front view, side view, 360° view, etc., providing images from an area surrounding the vehicle 102. As another example, the vehicle 102 may include one or more sensors 114, e.g., cameras 114, mounted inside a cabin of the vehicle 102 and oriented to capture images of users, including a vehicle operator, i.e., a driver, in the vehicle 102 cabin. In the context of this disclosure, an object is a physical, i.e., material, item that has mass and that can be represented by physical phenomena (e.g., light or other electromagnetic waves, or sound, etc.) detectable by sensors 114. Other sensors 114 may include seat pressure sensors 114 able to sense the presence of a weight on a seat, and ambient light sensors 114 capable of determining a magnitude of ambient light outside of the vehicle. Thus, the vehicle 102, and people, as well as other items including as discussed below, fall within the definition of "object" herein. Additional example sensors 114 may also include steering sensors, drive motor sensors, brake sensor, wheel speed sensors, and battery sensors.

The vehicle communication module 116 allows the vehicle computer 120 to communicate with a remote computer (not shown) of the server 106, and/or the user device 104, by way of example, a messaging or broadcast protocol such as Dedicated Short Range Communications (DSRC), Cellular Vehicle-to-Everything (C-V2X), Bluetooth® Low Energy (BLE), Ultra-Wideband (UWB), Wi-Fi, cellular, and/or other protocol that can support vehicle-to-vehicle, vehicle-to-structure, vehicle-to-cloud communications, or the like, and/or via the system network 108.

The vehicle computer 120 is a computing device that includes a processor and a memory such as are known. The memory includes one or more forms of computer-readable media, and stores instructions executable by the vehicle computer 120 for performing various operations, including as disclosed herein. The vehicle computer 120 can further include two or more computing devices operating in concert to carry out vehicle 102 operations including as described herein. Further, the vehicle computer 120 can be a generic computer with a processor and memory as described above and/or may include a dedicated electronic circuit including an ASIC (application-specific integrated circuit) that is manufactured for a particular operation, e.g., an ASIC for processing sensor 114 data and/or communicating the sensor 114 data. In another example, the vehicle computer 120 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the vehicle computer 120.

The vehicle computer 120 may include or be communicatively coupled, an example coupling provided by the vehicle communication network 118 such as a communications bus as described further below, to more than one processor, e.g., included in electronic controller units (ECUs) or the like included in the vehicle 102 for monitoring and/or controlling various vehicle components 110, e.g., a transmission controller, a brake controller, a steering controller, etc. The vehicle computer 120 is generally arranged for communications on the vehicle communication network 118 that can include a communication bus in the vehicle 102 such as a controller area network (CAN) or the like, and/or other wired and/or wireless mechanisms including Wi-Fi and Bluetooth®.

Via the vehicle communication network 118, the vehicle computer 120 may transmit messages to various devices in the vehicle 102 and/or receive messages (e.g., CAN messages) from the various devices, e.g., sensors 114, actuators 112, ECUs, etc. Alternatively, or additionally, in cases where the vehicle computer 120 comprises a plurality of computing devices that may be associated with particular components and systems of the vehicle 102, the vehicle communication network 118 may be used for communications between the computing devices which may be represented as the vehicle computer 120 in this disclosure. Further, as mentioned below, various controllers and/or sensors 114 may provide data to the vehicle computer 120 via the vehicle communication network 118.

The vehicle computer 120 is programmed to receive data from one or more sensors 114, e.g., substantially continuously, periodically, and/or when instructed by the remote computer of the server 106, etc. The data may, for example, include a location of the vehicle 102. Location data specifies a point or points on a ground surface and may be in a known form, e.g., geo-coordinates such as latitude and longitude coordinates obtained via a navigation system, as is known, that uses the Global Positioning System (GPS) and/or dead reckoning. Additionally, or alternatively, the data can include a location of an object, e.g., a vehicle 102, a sign, a tree, a person, etc., relative to the vehicle 102. As one example, the data may be image data of the environment around the vehicle 102. In such an example, the image data may include one or more objects and/or markings, e.g., lane markings, on or along a road. Image data herein means digital image data, i.e., comprising pixels, typically with intensity and color values, that can be acquired by cameras 114. The sensors 114 can be mounted to any suitable location in or on the vehicle 102, e.g., on a vehicle 102 bumper, on a vehicle 102 roof, etc., to collect images of the environment around the vehicle 102.

In addition, the vehicle computer 120 may be configured for communicating via the vehicle communication module 116 and the system network 108 with devices outside of the vehicle 102, e.g., with the user device 104 and the server 106, using wireless communications (cellular and/or C-V2X, etc.) or direct radio frequency communications. The communication module 116 could include one or more mechanisms, such as a transceiver, to facilitate such communication, and may employ any desired combination of wireless (e.g., cellular, wireless, satellite, microwave, audio, ultrasonic, and radio frequency) communication mechanisms and any desired network topology (or topologies when a plurality of communication mechanisms are utilized). Exemplary communications provided via the communication module 116 include cellular, Bluetooth®, IEEE 802.11, Ultra-Wideband (UWB), Near Field Communication (NFC), dedicated short range communications (DSRC), Cellular Vehicle-to-Everything (C-V2X), and/or wide area networks (WAN), including the Internet, providing data communication services.

The remote server 106 can be a conventional computing device, i.e., including one or more processors and one or more memories, programmed to provide operations such as disclosed herein. Further, the remote server 106 can be accessed via the network 108, e.g., the Internet, a cellular network, and/or or some other wide area network, particular forms of which may be characterized as a cloud server 106.

The system network 108 represents one or more mechanisms by which a vehicle computer 120 may communicate with remote computing devices, e.g., the remote computer of the server 106, another vehicle computer, etc. Accordingly, the network 108 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), UWB, NFC, IEEE 802.11 including Wi-Fi, vehicle-to-vehicle (V2V) such as Dedicated Short Range Communications (DSRC), etc.), local area networks (LAN) and/or wide area networks (WAN), including the Internet, providing data communication services).

An example user device 104 may be provided by a smartphone 104 or a purpose-specific wireless communication device incorporating a suitable vehicle control software application. The user device 104, like other elements of the vehicle image projection control system 100, may include hardware suited to connecting to wireless communication networks (e.g., using Bluetooth®, Bluetooth® Low Energy (BLE), UWB, NFC, IEEE 802.11 including Wi-Fi, vehicle-to-vehicle (V2V) such as Dedicated Short Range Communications (DSRC), C-V2X, etc.), local area networks (LAN) and/or wide area networks (WAN), including the Internet, providing data communication services).

Figure 2:
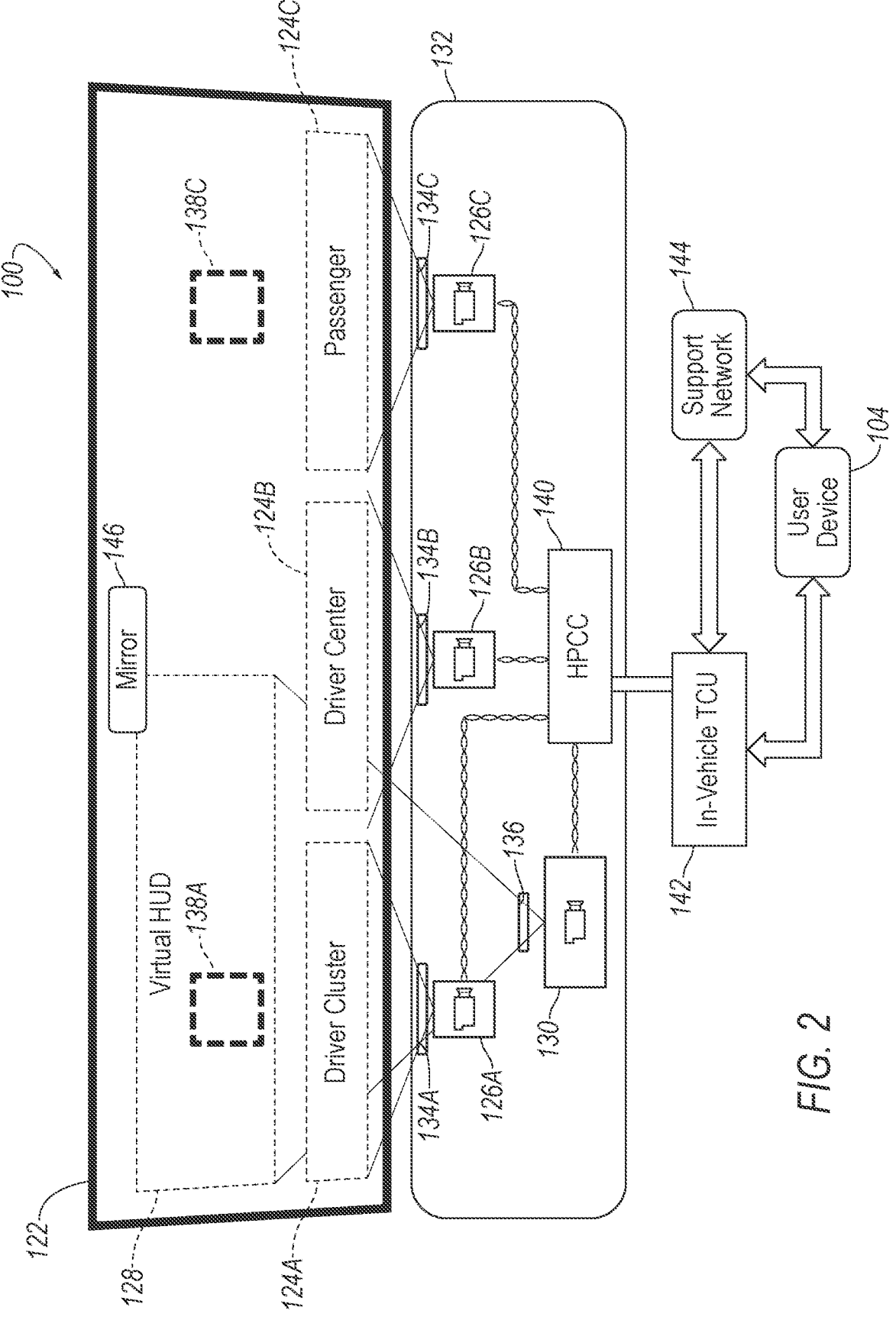
FIG. 2 is a more detailed block diagram of the example image projection control system of FIG. 1.

The vehicle image projection control system 100 as illustrated in FIG. 2 includes the example window 122, i.e., the windshield 122, that includes the substantially transparent HUD screens 124A, 124B, and 124C. The windshield 122 has a laminated structure, described below in the context of FIG. 3, which includes a holographic film layer 152. The holographic film layer 152 may be formed of a photopolymer film that may extend across the entire windshield 122 and include one or more discrete areas upon which holographic optical elements ("HOEs") are formed, e.g., etched. Each of the HUD screens 124A, 124B, and 124C are defined by a corresponding HOE of the holographic film layer 152. Based on the relative positioning of each of the screens 124A, 124B, and 124C, and given a left-drive vehicle in which a vehicle operator, i.e., a driver, is intended to be seated on a left side of the vehicle 102, the leftmost HUD screen 124A may be referenced to as a driver cluster screen 124A, the HUD screen 124B to the right of the screen 124A may be referenced to as the driver center screen 124B, and the right-most HUD screen 124C may be referenced to as the passenger screen 124C.

There may be separate transparent display digital light HUD projectors 126A, 126B, and 126C, alternatively referenced to as TD HUD projectors herein, associated with each of the HUD screens 124A, 124B, and 124C. Similar to the above-described approach to naming the HUD screens 124A, 124B, and 124C, the TD HUD projectors 126A, 126B, and 126C may be respectively referenced to as, from left to right, a driver cluster projector 126A, a driver center projector 126B, and a passenger projector 126C.

The vehicle operator's view of the windshield 122 may include a virtual HUD viewing area 128 in which the operator is able to view information projected by the virtual HUD projector imager 130. The virtual HUD viewing area 128 is a portion of the windshield 122 on which or beyond which an image provided by the virtual HUD projector 130 may be viewed by the operator.

Each of the projectors 126A, 126B, 126C, and 130 may be disposed beneath or behind a dashboard 132. The dashboard 132, from a perspective of a vehicle operator seating position, is disposed in a forward portion of an interior of the vehicle 102 and below the windshield 122. The dashboard 132 may extend a full width of the interior of the vehicle 102. The dashboard 132 may be alternatively referenced to as an instrument panel 132.

When the projectors 126A, 126B, 126C, and 130 are all disposed beneath or behind a dashboard, provision must be made for light to pass from the projectors 126A, 126B, 126C, and 130 to a viewing area for each. Such provision may be provided by apertures 134A, 134B, 134C, and 136 in the dashboard. The dashboard 132 of FIG. 2 is schematically illustrated as providing a driver cluster aperture 134A, a driver center aperture 134B, a passenger aperture 134C, and a virtual HUD aperture 136, each aperture 134A, 134B, 134C, and 136 respectively aligned with projectors 126A, 126B, 126C, and 130. In some applications, aperture 136 and aperture 134A may be combined into one larger aperture for projectors 126A and 130. Alternatively, apertures 134A and 134B may be combined into a single aperture. In yet another configuration, apertures 134A, 134B and 136 may all be combined into a single aperture.

The TD HUD projectors 126A, 126B, 126C are positioned and oriented to respectively project images onto the HUD screens 124A, 124B, and 124C. The virtual HUD projector 130 may project an image having the appearance of being beyond the windshield 122 viewable in the virtual HUD viewing area 128 without a screen in the windshield 122. The images on the HUD screens 124A, 124B, and 124C that are projected by the TD HUD projectors 126A, 126B, and 126C are only viewable from predetermined positions within the vehicle. The predetermined positions are specific to each of the HUD screens 124A, 124B, and 124C. Likewise, the image projected by the virtual HUD projector 130 is only viewable from a predetermined position within the vehicle.

Each of the predetermined positions for viewing the images on the HUD screens 124A, 124B, and 124C and the image provided by the virtual HUD projector 130 may be defined by an eye box 138A and 138C for each. The eye boxes for each of the driver cluster screen 124A, the driver center screen 124B, and the image from the virtual HUD projector 130 may overlap and may be substantially the same as each other and aggregated in a first eye box identified herein as a driver eye box 138A. The eye box for the passenger screen 124C is a second eye box identified herein as a passenger eye box 138C. While the eye boxes 138A and 138C are shown as being rectangular in FIG. 2, the eye boxes may be, by way of example, spherical or ovoid.

The example projectors 126A, 126B, 126C, and 130 may each be in electronic communication with an example projector controller 140 as may be provided by a high performance computer cluster 140, alternatively referenced to as an HPCC 140. Such electronic communication may be effected wirelessly or by wire, as may be provided by the vehicle communication network 118. The projector controller 140 may provide image data to each of the projectors 126A, 126B, 126C, and 130. The projector controller 140 may comprise part of the computer 120.

The projector controller 140 may be in electronic communication, effected either by wire or wirelessly, with an in-vehicle telematics control unit 142 which may alternatively be referenced to as a TCU 142. The projector controller 140 may receive image data for each of the projectors from the TCU 142. The TCU 142 may comprise at least a part of the communication module 116.

The TCU 142 may also electrically communicate with, both sending data to and receiving data from, the user device 104. Data from the user device 104 may include entertainment content streamed from the internet which may be accessed in the form of cellular data available from public and subscription cellular data services. Data to the user device 104 may include commands made by a vehicle operator or a front seat passenger on an in-vehicle dashboard display screen 110, comprising one of the vehicle components 110, located, by way of example in the dashboard 132 or in a center console of the vehicle, below the dashboard 132. The in-vehicle display screen 110, when included, may also be in electronic communication with the TCU 142. The TCU 142 may be connected to the user device 104 wirelessly, via Wi-Fi or Bluetooth®, or by wire, as with a cable having appropriately compatible termination ends, such as, by way of example, a USB plug or a USB-C plug.

The TCU 142 may also electrically communicate with, both sending data to and receiving data from, a proprietary support network 144. The proprietary support network 144 may comprise elements of each of the server 106 and the system network 108. The electronic communication between the TCU 142 and the proprietary network may be, by way of example, via cellular data, satellite data communication, UWB or Wi-Fi communication. An example proprietary support network is found in the Ford Service Delivery Network. The user device 104 may also be in electronic communication with the proprietary support network 144.

FIG. 2 includes a schematic representation of an example rear-view mirror 146 to aid in illustrating the relative positions of the screens 124A, 124B, 124C and the eye boxes 138A and 138C.

Figure 3:
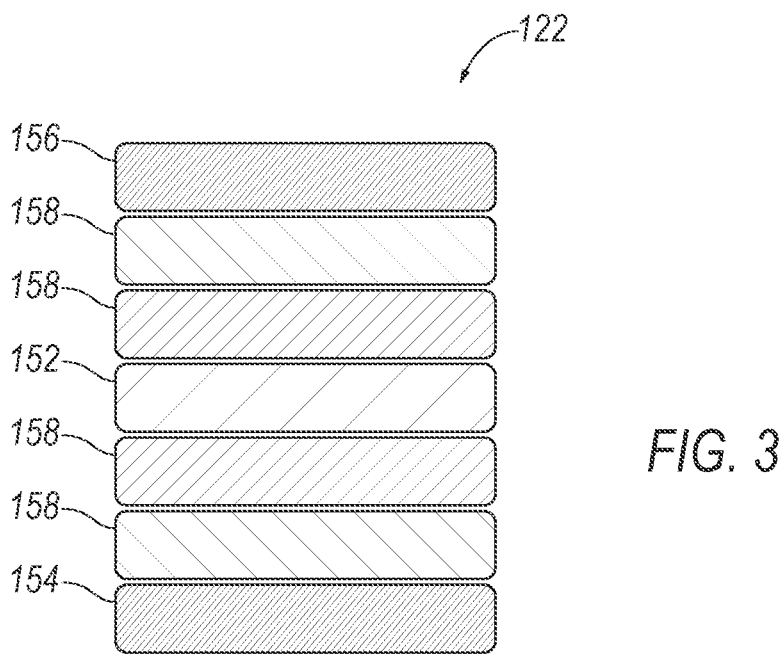
FIG. 3 is a schematic illustration of first example layers of a laminated windshield.

FIG. 3 is a schematic illustration of a first example of lamination layers of the windshield 122 in the regions of the windshield comprising the driver cluster screen 124A, the driver center screen 124B, and the passenger screen 124C. A key layer is the holographic film layer 152. The holographic film layer 152 has its HOEs configured uniquely and specifically for each of the screens 124A, 124B, and 124C to provide reflections of images projected onto each screen by the respective TD HUD projectors 126A, 126B and 126C only to the targeted eye boxes 138A and 138C. In the case of the screens 124A and 124B, the reflected images thereof can only be viewed at a design-intent clarity by a person sitting in a vehicle operator seat with at least one of their eyes disposed in the eye box 138A. In the case of the passenger screen 124C, the reflected images thereof can only be viewed at the design-intent clarity by a person sitting in a vehicle front passenger seat, i.e., a front seat passenger, with at least one of their eyes disposed in the eye box 138C. Reduced clarity viewing of the screens 124A and 124B may be possible for a passenger in the vehicle 102 seated in back of the operator when the eye box 138A expands conically in a rearward direction away from the screens 124A and 124B. Similarly, reduced clarity viewing of the screen 124C may be possible for a passenger in the vehicle 102 seated in back of the front passenger when the eye box 138C expands conically in a rearward direction away from the screen 124C.

As further shown in FIG. 3, the holographic film layer 152 may be disposed between a first glass layer 154 and a second glass layer 156. The holographic film layer 152 may be supplemented by a plurality of transparent supplemental film layers 158 disposed between the holographic film layer 152 and the glass layers 154 and 156. Example supplemental film layers 158 may include one or more of any of a polyvinyl butyral film layer, a polyamide film layer, and a polyethylene terephthalate film layer, i.e., a PET film layer. Laminated windshields incorporating the holographic film layer 152 are available from, by way of example, Ceres Holographics, Ltd. of Livingston, Scotland.

Figure 4:
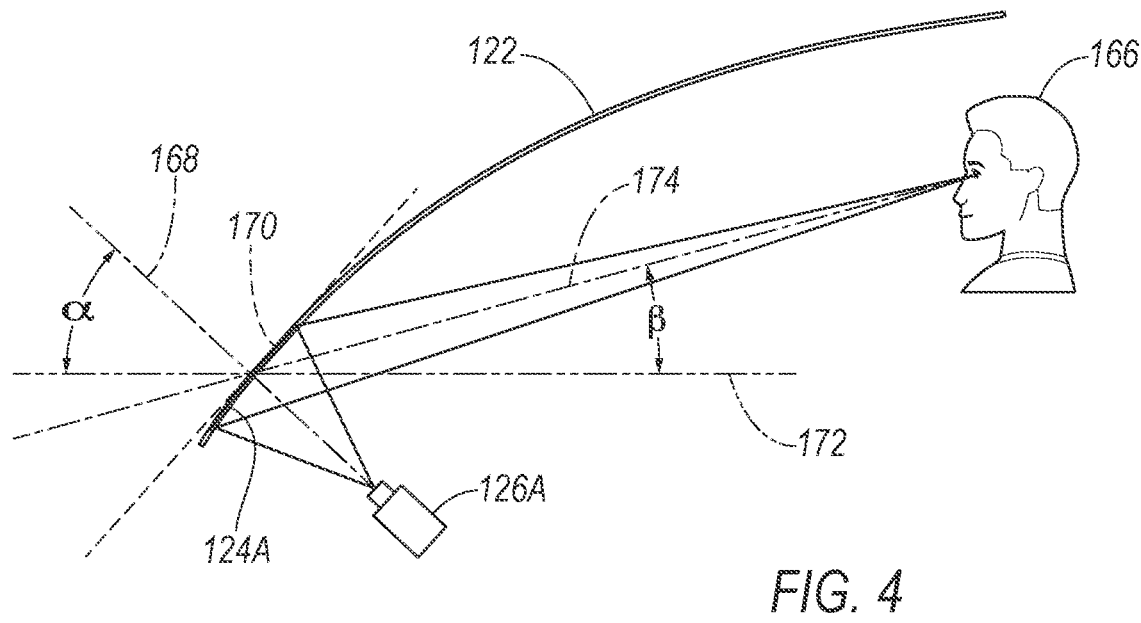
FIG. 4 is a side view of a driver in an example seated position in an example vehicle illustrating both an example image projection angle and an example viewing angle associated with an example projector.

FIG. 4 shows a vehicle operator 166 viewing an image on the driver cluster screen 124A as projected by the driver cluster projector 126A. The driver cluster projector 126A is oriented upward from a location below the driver cluster screen 124A to project along a projection axis 168 that may be substantially normal to a windshield tangential plane 170. The windshield tangential plane 170 is tangent to the windshield 122 and the driver cluster screen 124A at a point where the projection axis 168 intersects the windshield 122. The projection axis 168 is oriented at a projection angle α relative to a horizontal plane 172. An example value of a may be 61 degrees.

The operator views the image on the driver cluster screen 124A along a viewing axis 174 oriented at a viewing angle β relative to the horizontal plane 172. The viewing angle β may be determined by considering factors that may include a location of the operator's eyes relative to the driver cluster screen 124A and the image projected thereon, a distance of the operator's eyes from the driver cluster screen 124A, a vertical distance between the operator's eyes and a center of the driver cluster screen 124A, the optical characteristics of the holographic film layer 152, the slope of the windshield, and the projection angle α. An example value of the angle β may be in a range of six to seven degrees. The operator's eyes must be in the driver eye box 138A to view the projected image on the driver cluster screen 124A. While only the geometry for the driver cluster screen 124A and driver cluster projector 126A are illustrated, the geometries for the other screens 124B, 124C and projectors 126B, 126C may be substantially similar.

Figure 5:
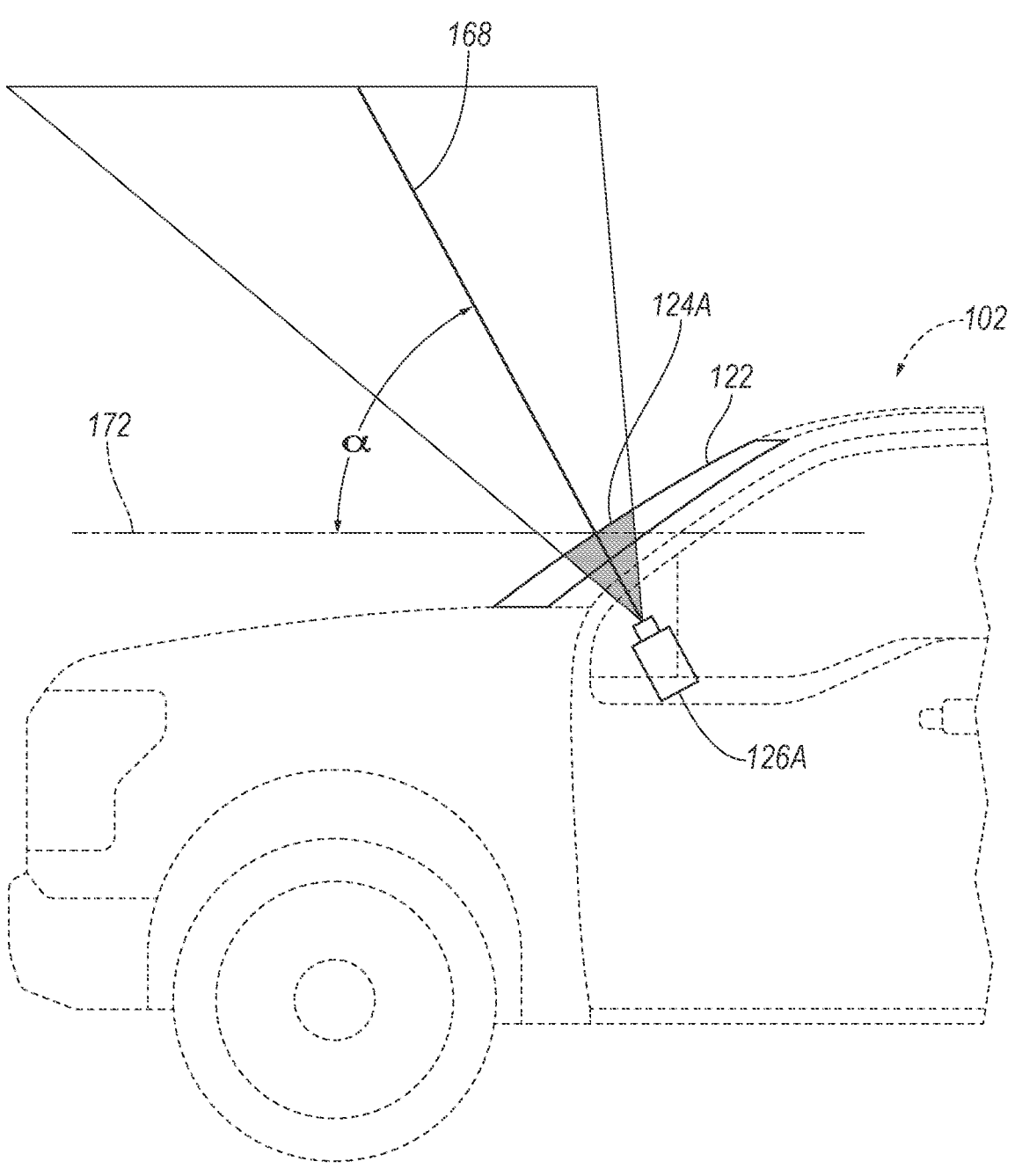
FIG. 5 is a side view of an example vehicle with an example projector illustrating an example image projection angle.

FIG. 5 illustrates a projection of light from the driver cluster projector 126A along the projection axis 168 beyond the driver cluster screen 124A. The driver cluster projector 126A and the driver cluster screen 124A are shown in a more complete vehicle setting than in FIG. 4. The geometric elements are as set forth above in the description of FIG. 4.

Figure 6:
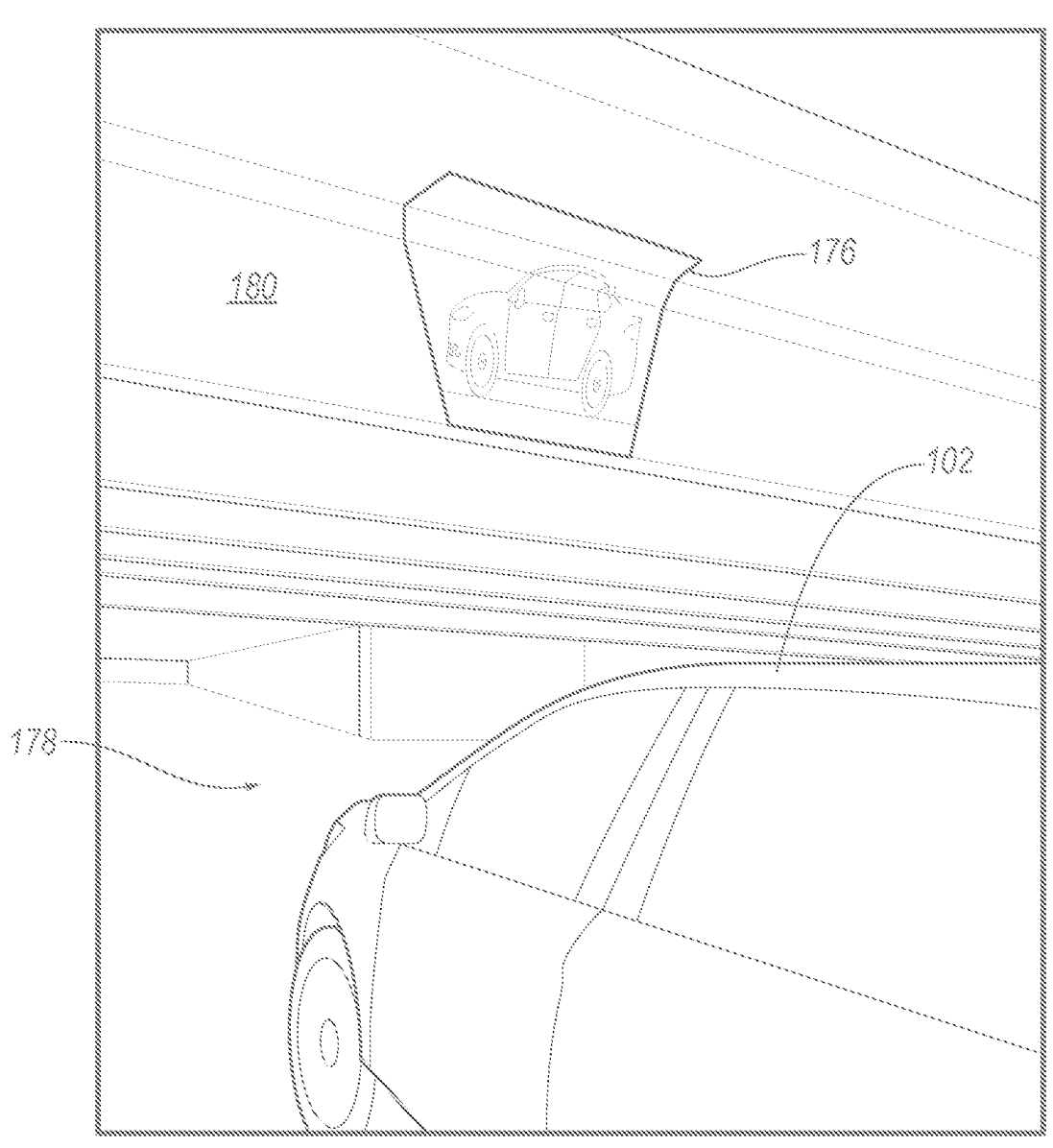
FIG. 6 illustrates an example incidental projection of the example projection system of FIG. 1 and FIG. 2.

FIG. 6 shows an example of an incidental projection image 176 that may be provided by one of the TD HUD projectors 126A, 126B, and 126C of the vehicle 102. The HUD screens 124A, 124B, and 124C reflect only a portion of the light projected thereonto as an image viewable by, depending on the screen location, the vehicle operator or the front seat passenger. Much of the light not reflected, an example portion being 60 percent, passes through the screens 124A, 124B, and 124C. A projector emitting 400 lumens of light may thus yield an incidental projection intensity of 240 lumens of light. The light passing through the screen 124A, 124B, 124C, or any one thereof, when it strikes a surface 180 in a path of projection of the of the image beyond the windshield, may result in the incidental projection image 176 that can be seen outside of the vehicle.

Figure 7:
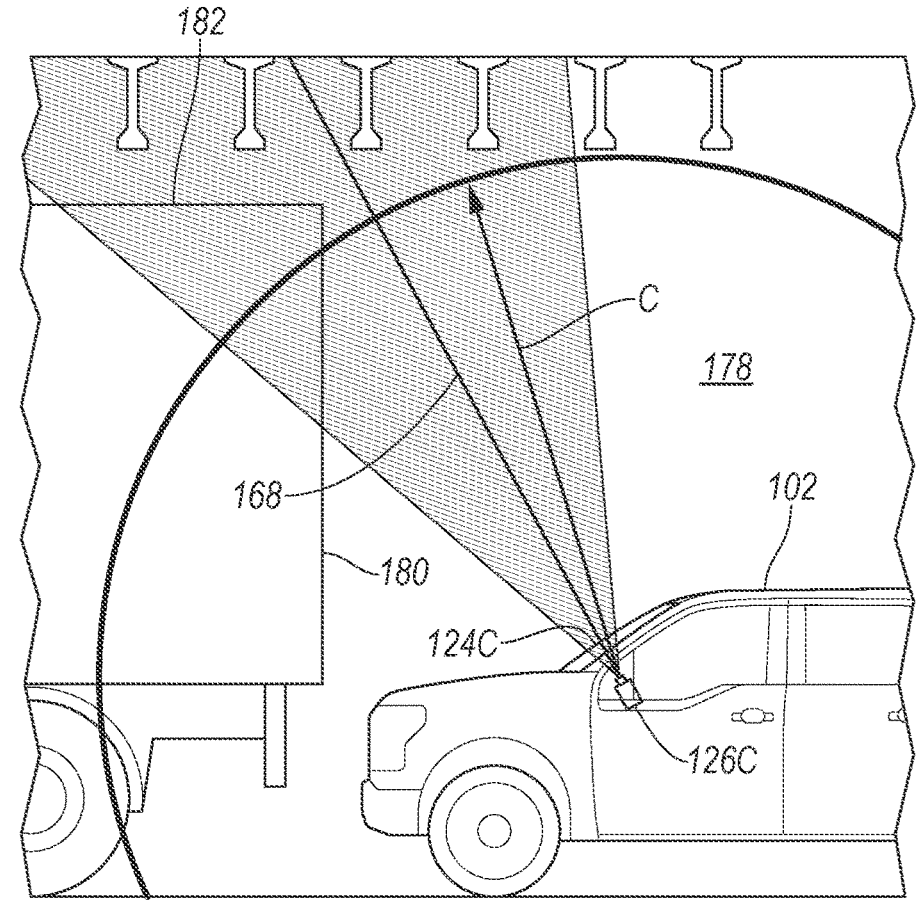
FIG. 7 illustrates an example positioning of an example vehicle that may result in an incidental projection of the example projection system of FIG. 1 and FIG. 2.

Some environments more than others, such as dark areas and heavily shaded areas, i.e., diminished light locations, are susceptible to a visible incidental projection image being seen by individuals that would not otherwise be able to see the images projected onto the screens 124A, 124B, 124C. Examples of diminished light locations 178 include parking garages, like that in FIG. 6, and road tunnels which may present surfaces that serve as secondary screens for the projection image 176 to form on. As shown in FIG. 7, other vehicles such as a large truck 182 or a trailer 182 having a large rear surface 180, may provide such secondary screens for incidental projection images 176. The projectors 126A, 126B, 126C may have a limited depth of field focal point. Additionally, the brightness of the incidental projection image 176 will decrease proportionately to a square of the distance of the surface 180 from the projector 126A, 126B, 126C. When the surface 180, and thus the incidental projection image 176, is beyond a predetermined distance C from the projectors 126A, 126B, 126C, the image 176 is sufficiently dimmed and blurred to not require any additional blurring to diminish its visibility. An example distance C is 4.6 meters (15 feet).

Figure 8:
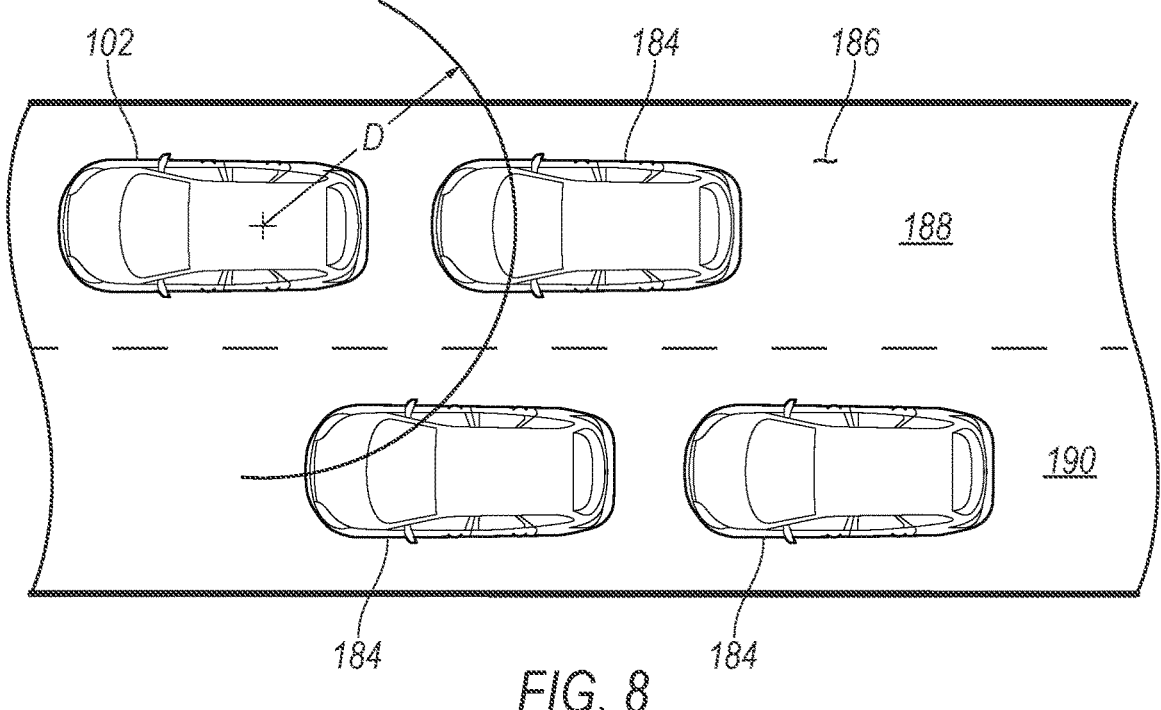
FIG. 8 illustrates an example relative positioning of vehicles that may be within a viewing range of an incidental projection.

FIG. 8 shows a plurality of adjacent vehicles 184 near the vehicle 102. The adjacent vehicles 184 may be disposed in any setting in which vehicles may be in close proximity, such as in heavy traffic on a road 186. The road 186 may have multiple lanes 188, 190. The vehicle 102 equipped with the TD HUD projectors 126A, 126B, 126C may be in a first lane 188, e.g., a right hand lane, and the adjacent vehicles 184 may be in either or both the first lane 188 and a second lane 190. When an adjacent vehicle 184 is within a predetermined distance D of the vehicle 102, occupants of the adjacent vehicles 184 may be able view the incidental projection image 176. Pedestrians on walkways (not shown) within the predetermined distance D may also be able to see the incidental projection image 176. An example distance D may be 15 meters (50 feet).

As some of the images being projected on the HUD screens 124A, 124B, 124C may be private, it is desirable to adjust any incidental projection images 176 to diminish the visibility of the incidental projection images 176, and thus make the images 176 difficult to discern by at least anyone outside of the vehicle 102 in which the TD HUD projectors 126A, 126B and 126C are disposed. As a passenger able to view images on the passenger screen 124C may be more free to consider images not relating to operating the vehicle than the vehicle operator 166, there may be a heightened interest in adjusting incidental projection images 176 intended to be viewed only on the passenger screen 124C. However, there may be benefits to enabling adjusting of any incidental projection images that may be visible to people outside of the vehicle 102.

Accordingly, the vehicle image projection control system 100 may, upon detecting a condition indicative of a possible incidental projection of an image beyond the windshield 122, adjust the projection of the image to diminish a visibility of the image beyond the windshield 122. Conditions indicative of such a possible incidental projection 176 may include an ambient light level below a predetermined light level. Conditions indicative of a possible incidental projection may also include sensing a surface that may serve as a projection surface and checking for possible viewers of any incidental projection images 176. Adjusting the projection of the image 176 may include dimming the image 176, blurring the image 176, and stopping projection of the image 176. These options are discussed in more detail below.

Figure 9:
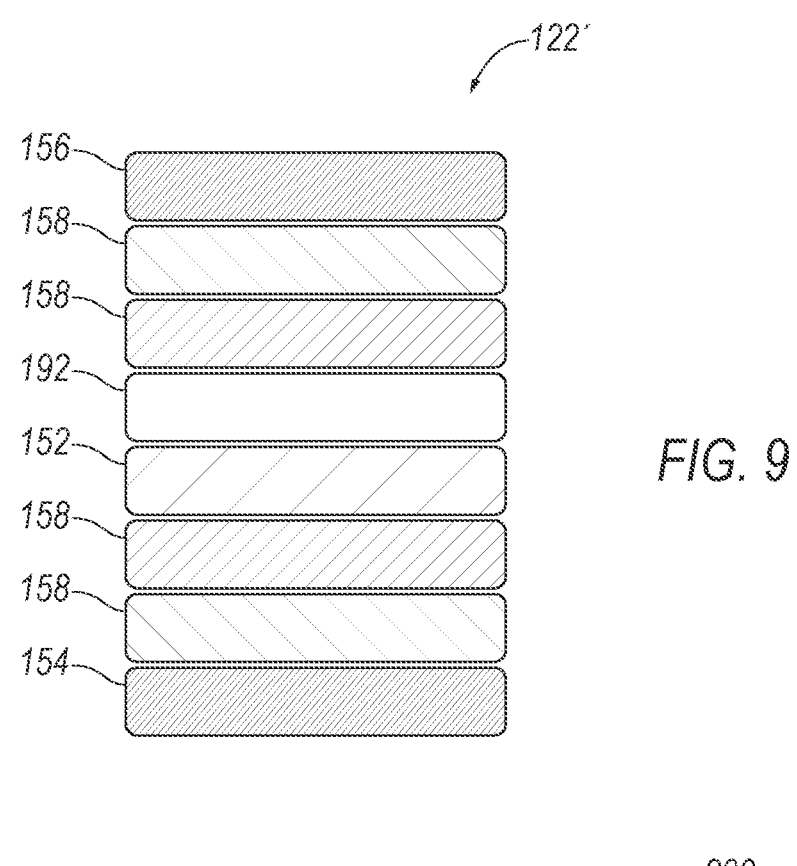
FIG. 9 is a schematic illustration of second example layers of a laminated windshield.

FIG. 9 illustrates an alternatively layered windshield 122' that may be employed to block the projection of incidental projection images 176. The layers that may be employed in the windshield 122 of FIG. 3 may also be found in the windshield 122' of FIG. 9. One additional layer 192 has been added to the windshield 122', distinguishing it from the windshield 122. The additional layer 192 comprises an electronically tintable layer 192. The electronically tintable layer 192 may be used to selectively render a portion of the windshield 122' in which the layer 192 is disposed substantially opaque. The electronically tintable layer 192 may be placed on a far side of the holographic film layer 152 relative to the location of the associated one of the TD HUD projectors 126A, 126B, and 126C. Tintable portions of the tintable layer 192 may be sized to be substantially the same size as the HOEs defining the screens 124A, 124B, 124C and substantially aligned therewith. To ensure blocking of all of the image being projected, the tintable portions of the tintable layer 192 aligned to be associated with each of the screens 124A, 124B, 124C are located and sized to at least cover the portion of the windshield that the projection of the image from the associated TD HUD projector 126A, 126B, 126C impinges on. Accordingly, the tintable layer 192 is illustrated as disposed between the holographic film layer 152 and the second glass layer 156. The second glass layer 156 may be an exterior glass layer 156. Electronically tintable layers 192 are available from various suppliers as is known. U.S. Patent Publication No. 2022/0283458A1 describes an alternative tintable layer with localized tinting. Actuation of the tintable layer 192 to adjust it to a substantially opaque condition may be employed to substantially block a transmission of light from the TD HUD projector or TD HUD projectors 126A, 126B, 126C through and beyond the windshield 122'. Blocking the transmission of light from the TD HUD projectors with the tintable layer 192 prevents the generation of any incidental projection images 176.

The system 100 may be operated in the following manner.

The vehicle computer 120 can receive data from sensors 114 and/or from the server 106. The vehicle computer 120 may also receive data from the user device 104. The vehicle computer 120 is programmed to, upon detecting a sensed condition indicative of a possible projection of an incidental projection image 176 onto a surface beyond the windshield 122, adjust projection of the image 176 to diminish a visibility of the projection of the image 176 to diminish a visibility of the image beyond the windshield. Such adjustment may be separate of actuation of headlights 110 by the vehicle computer 120.

The vehicle 102 may include a light sensor 114 to sense when a first predetermined light level, i.e., an intensity of light, outside of the vehicle is either exceeded or not exceeded. Measurements of the light level outside of the vehicle 102, i.e., the ambient light level, may be made from inside the vehicle. For example, the light sensor 114 may be mounted on the dashboard below the windshield 122, 122'.

When the headlights 110 are set to operate in an automated mode, and the sensed ambient light level is below the predetermined light level, i.e., the predetermined light level is not exceeded, the computer 120 may actuate, i.e., turn on, the vehicle headlights 110 to allow the vehicle operator 166 to better see the road in front of the vehicle. At the same time that the headlights 110 are actuated, a brightness, i.e., an intensity or level, of light for the dashboard instrumentation 110 (e.g., speedometer, tachometer, fuel gauge, etc.) may be adjusted, responsive to the computer, to a dimmed brightness setting. The dimmed brightness setting may be set by the vehicle operator to a value less than a maximum available instrumentation brightness. When the headlights 110 are in the automated mode and the light level outside of the vehicle 102 is greater than the first predetermined light level, the headlights 110 may be turned off by the computer and the brightness of the light for the instrumentation 110 may be increased to a setting of a maximum available brightness. Likewise, if the headlights 110 are selectively turned off by the vehicle operator 166, the brightness of the light for the instrumentation 110 may be automatically increased to the setting of a maximum available brightness. The maximum level of brightness facilitates the operator 166 being able to more easily read the instrumentation 110 in bright daylight, particularly when the instrumentation 110 includes a digital screen.

The actuation of the headlights 110 responsive to a diminution of light outside of the vehicle 102, and the associated dimming of the dashboard illumination, may be delayed for a predetermined period of time after the diminution of the ambient light level below the first predetermined light level is sensed. An example period of delay time for headlight actuation is 15 seconds. If the brightness of light from the TD HUD projectors 126A, 126B, 126C is synchronized with the brightness of the lighting for the dashboard instrumentation and the actuation of the headlights, then the brightness of any incidental projection images from the TD HUD projectors 126A, 126B, 126C will also remain at a maximum brightness for the same period of time. That period of delay may be sufficient for an incidental projection image to be made visible to people outside of the vehicle 102 when there is a sudden decrease in the light level outside of the vehicle 102, as when entering a tunnel or a garage. The image 176 may be displayed on the rear surface of a truck or trailer, or on a structural surface of the tunnel or garage, such as the ceiling or overhead supports. Similarly, the incidental projection image may become readily visible when a vehicle operator turns the headlights 110 off while in a relatively dark area, i.e., diminished light location 178 such as a tunnel or a parking garage. Adjusting the brightness of the images from the TD HUD projectors 126A. 126B, 126C independent of headlight actuation allows a more desirable timing of the adjustment, e.g., a more rapid adjustment, of the projection of the incidental projection image 176 to diminish a visibility of the image 176. More specifically, the adjustment may include dimming the image 176 before the headlights 110 are illuminated, with the dimming being thus independent of the headlights being illuminated. Additionally, a second predetermined light level, either brighter or dimmer than the first predetermined light level, may be employed to trigger adjusting the image 176.

Alternatives to dimming the image 176 may be employed to diminish the visibility of the incidental projection images 176. For example, the visibility of the image 176 may be diminished by blurring a focus of the image 176. A modest diminution of a sharpness of an image on a one of the screens 124A, 124B, 124C may allow the viewer of the screen to still adequately perceive a content of the image on the screen, but, given the greater distance of the incidental projection image 176 from the TD HUD projector 126A, 126B, 126C, render the corresponding incidental projection image 176 sufficiently indiscernible. The blurring can be of either an entirety of the image, or identified protected image content. Blurring based on identified protected image content may be done digitally, using artificial intelligence trained to recognize protected content. Blurring by digital means may be achieved on a scale that may range from mild distortion to a substantial blocking of the image, in part or in its entirety. Identified protected image content may include, by way of example, text and faces in the image 176. A default inherent blurring of the entire image may be achieved by providing lens systems of the projectors 126A, 126B, 126C with a limited depth of field focal point. For example, the projector lens system for each of the projectors 126A, 126B, 126C may be designed so that a clear and sharp image can only be projected 0.6 to 0.9 meters (2 to 3 feet) from the projector lens, and the image would be substantially out of focus approximately 0.3 meters (one foot) or so past the windshield.

Another approach to diminishing the visibility of the incidental projection images 176 is to block the incidental projection image 176. Blocking may be achieved by, responsive to a command from the computer 120, energizing the electronically tintable layer 192 to provide a substantially opaque layer. The energized tintable layer 192 substantially blocks transmission of light, including light from the corresponding one or ones of the TD HUD projectors 126A, 126B, 126C, past the windshield 122. The computer may automatically energize the tintable layer 192 when conditions are indicative of the possible projection of an incidental projection image.

Yet another approach to diminishing the visibility of the incidental projection images 176 is to program the computer to stop projecting images from one or all of the TD HUD projectors 126A, 126B, 126C when conditions are indicative of the possible projection of an incidental projection image 176. This approach may be supplemented by wirelessly communicating the image that would otherwise be projected by the driver cluster projector 126A to a user device 104 of a passenger for viewing by the passenger on the passenger's user device 104. This would also prevent viewing of both the incidental projection image 176, as might be seen through a sun roof of the vehicle, and the screen 124C, by any rear seat passengers inside the vehicle 102.

If sensed conditions are consistent with circumstances in which the incidental projection image 176 may not be seen by another, no action may be taken to adjust the image 176. For example, if the light level outside of the vehicle 102 is above the predetermined light level, adjustments to the image 176 and to settings of the TD HUD projector 126A, 126B, 126C need not be made. Likewise, when no potential viewers of the incidental projection image 176, e.g., nearby pedestrians or vehicles, are sensed by the vehicle sensors 114 to be within a predetermined distance of the vehicle 102, adjustments to diminish the visibility of the image 176, e.g., by adjusting the settings of the TD HUD projector 126A, 126B, 126C, may be suppressed or not made. When vehicle sensors 114 sense the presence of potential projection surfaces, such as garage or tunnel walls, garage or tunnel ceilings, and a rear surface of a truck or trailer, adjustments to diminish the visibility of the image 176 may be made, but when such potential projection surfaces are absent, adjustments to diminish the visibility of the image 176, e.g., by adjusting settings of the TD HUD projector 126A, 126B, 126C, need not be made. Also, instead of relying at least solely on the light sensor 114 to determine if the ambient light level is reduced, a geographic location of the vehicle 102 based on Global Positioning System (GPS) sensors 114 may be used. The geographic location of the vehicle 102 may be compared to geographic locations of landscape features, e.g., tunnels, parking structures, that, when the vehicle 102 is located therein, will block a transmission of sunlight. The computer 120 may thus determine that, when the vehicle 102 is disposed in such a structure 178, the light level outside of the vehicle 102 is less than the predetermined light level.

Figure 10:
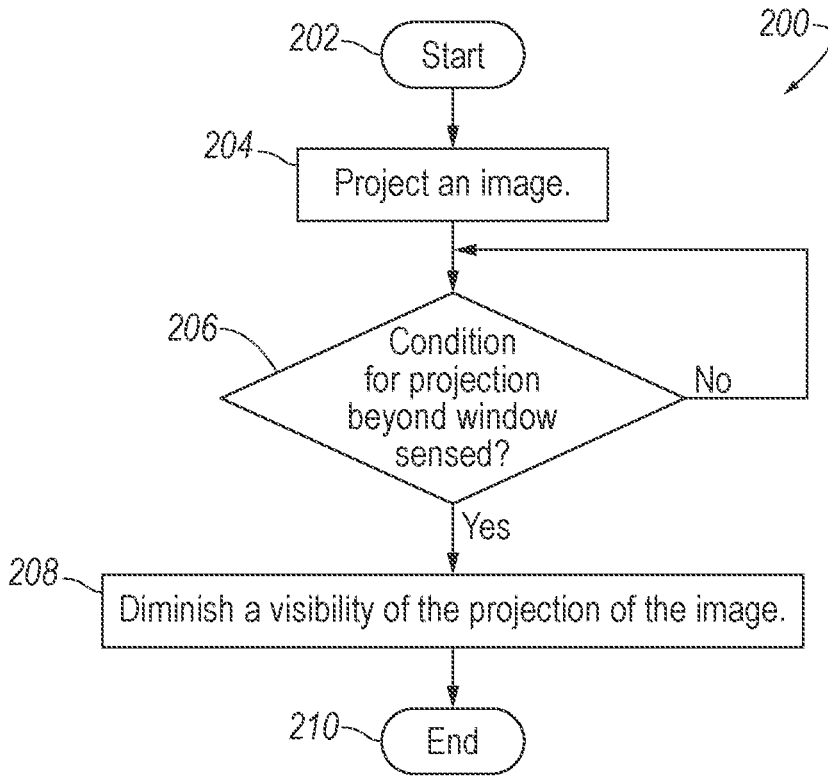
FIG. 10 is an example flow chart of an example process for reducing incidental projection of the example projector.

FIG. 10 is a diagram of an example process 200 executed in the vehicle computer 120 according to program instructions stored in a memory thereof for adjusting projection of the incidental projection image to diminish the visibility of the projection of the image 176 beyond the windshield independent of headlight actuation. The process 200 includes multiple blocks that can be executed in the illustrated order. The process 200 could alternatively or additionally include fewer blocks or can include the blocks executed in different orders.

The process 200 begins in a start block 202. In the block 202, the computing device 120, i.e., the vehicle computer 120, receives data from one or more vehicle sensors 114 via the vehicle network, from the remote server 106 via the network 108, and/or from the user device 104 via the network 108 as discussed above. The process 200 continues in a process block 204.

In the block 204, the vehicle computer 120, based on data from the vehicle sensors 114, including for example, touch sensors 114 that may be associated with the display screen 110 for sensing passenger and operator inputs, directs at least one of the TD HUD projectors 126A, 126B, 126C to project an image. The process 200 continues in a decision block 206.

In the block 206, the vehicle computer 120, based on data from the vehicle sensors 114, including for example, the light sensor 114, LIDAR sensors 114, cameras 114, and radar sensors 114, determines whether or not a condition for projection of the image 176, i.e., the incidental projection image 176, beyond the windshield 122, has been sensed. Example conditions for projection of the image 176 may include one or more of the following. One such condition is a sensing of a light level outside of the vehicle below the predetermined light level. Another such condition may be a sensing of a geographic location of the vehicle 102 at a diminished light location. Another condition may be a sensing of a surface 180 in the path of the projection of the image 176 from, e.g., in front of, the vehicle 102 and less than a predetermined distance C from the vehicle 102. And another condition may be sensing of potential viewers, e.g., pedestrians and other vehicles 184, within a predetermined distance D of the vehicle 102. When no condition for projection of the image 176 beyond the windshield 122 has been sensed, the process 200 loops back to the decision block 206 and continues to check whether the condition for projection of the image 176 beyond the windshield 122 has been sensed. When one or more condition for projection of the image 176 beyond the windshield 122 has been sensed, the process 200 continues in a process block 208.

In the block 208, a visibility of the projection of the image 176 is diminished. The image 176 may be diminished by any one or any combination of the following steps. The image 176 may be dimmed. The image 176 may be blurred in its entirety beyond any inherent blurring. The image 176 may be selectively blurred or blocked to protect image content. Projection of the image 176 may be stopped. Projection of the image 176 may be stopped and data defining the image 176 may be directed to the user device 104 for viewing on the used device 104. The electronically tintable layer 192 may be adjusted to a substantially opaque setting to substantially block the projection of the image 176 beyond the tintable layer 192. The process 200 continues to a block 210.

In the block 210, the process 200 ends.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A computing device, comprising a processor and a memory, wherein the memory stores instructions executable by the processor such that the computing device is programmed to:

project an image from a vehicle-integrated projector for a heads-up display onto a window of a vehicle including a layer of holographic film; and upon detecting a sensed condition indicative of a possible projection of the image onto a surface beyond the window, adjusting projection of the image to diminish a visibility of the projection of the image beyond the window independent of headlight actuation.

2. The computing device of claim 1, wherein the instructions further include instructions to suppress diminishing the visibility of the projection of the image beyond the window when potential viewers of the projection of the image beyond the window outside of the vehicle are not detected within a predetermined distance from the vehicle.

3. The computing device of claim 1, wherein the condition indicative of the possible projection of the image onto the surface beyond the window includes a predetermined light level outside of the vehicle.

4. The computing device of claim 1, wherein the condition indicative of the possible projection of the image onto the surface beyond the window includes a sensing of the surface in a path of the projection of the image from the vehicle.

5. The computing device of claim 1, wherein the condition indicative of the possible projection of the image onto the surface beyond the window includes a sensing of a geographic location of the vehicle in a diminished light location.

6. The computing device of claim 1, wherein adjusting the image includes dimming the image.

7. The computing device of claim 1, wherein adjusting the image includes blurring a focus of the image beyond the window exceeding any inherent blurring.

8. The computing device of claim 1, wherein adjusting the image includes selectively blurring protected image content of the image.

9. The computing device of claim 1, wherein adjusting the image includes stopping projection of the image from the projector.

10. The computing device of claim 1, wherein adjusting the image includes stopping projection of the image and wirelessly communicating the image to a user device of a passenger for viewing on the user device.

11. The computing device of claim 1, wherein the window includes an electronically tintable layer disposed between the layer of holographic film and an exterior glass layer in at least a portion of the window that the projection of the image impinges on and adjusting the image includes adjusting the tintable layer to a substantially opaque setting to substantially block the projection of the image beyond the tintable layer.

12. A method of restricting viewing of an image from a HUD projector projecting beyond a window, the method comprising the steps of:

projecting an image from a vehicle-integrated projector for a heads-up display onto a window of a vehicle including a layer of holographic film; and upon detecting a sensed condition indicative of a possible projection of the image onto a surface beyond the window, adjusting projection of the image to diminish a visibility of the projection of the image beyond the window independent of headlight actuation.

13. The method of claim 12, wherein the visibility of the projection of the image beyond the window is suppressed when potential viewers of the projection of the image beyond the window outside of the vehicle are not detected within a predetermined distance from the vehicle.

14. The method of claim 12, wherein the condition indicative of the possible projection of the image onto the surface beyond the window includes a predetermined light level outside of the vehicle.

15. The method of claim 12, wherein the condition indicative of the possible projection of the image onto the surface beyond the window includes a sensing of the surface in a path of the projection of the image from the vehicle.

16. The method of claim 12, wherein the condition indicative of the possible projection of the image onto the surface beyond the window includes a sensing of a geographic location of the vehicle in a diminished light location.

17. The method of claim 12, wherein adjusting the image includes dimming the image.

18. The method of claim 12, wherein adjusting the image includes blurring a focus of the image beyond the window exceeding any inherent blurring.

19. The method of claim 12, wherein adjusting the image includes stopping projection of the image from the projector.

20. The method of claim 12, wherein the window includes an electronically tintable layer disposed between the layer of holographic film and an exterior glass layer in at least a portion of the window that the projection of the image impinges on and adjusting the image includes adjusting the tintable layer to a substantially opaque setting to substantially block the projection of the image beyond the tintable layer.

* * * * *